US010282903B1

(12) United States Patent
Clark et al.

(10) Patent No.: US 10,282,903 B1
(45) Date of Patent: May 7, 2019

(54) SYSTEM AND METHOD FOR MATCHING VIRTUAL REALITY GOALS WITH AN OPTIMAL PHYSICAL LOCATION

(71) Applicant: INTERNATIONAL BUSINESS MACHINES CORPORATION, Armonk, NY (US)

(72) Inventors: Adam T. Clark, Mantorville, MN (US); Jeffrey K. Huebert, Rochester, NY (US); Aspen L. Payton, Byron, MN (US); John E. Petri, St. Charles, MN (US)

(73) Assignee: International Business Machines Corporation, Armonk, NY (US)

(*) Notice: Subject to any disclaimer, the term of this patent is extended or adjusted under 35 U.S.C. 154(b) by 1 day.

(21) Appl. No.: 15/814,433

(22) Filed: Nov. 16, 2017

(51) Int. Cl.
G06T 19/00 (2011.01)
H04W 4/02 (2018.01)
G02B 27/01 (2006.01)

(52) U.S. Cl.
CPC .......... G06T 19/003 (2013.01); G02B 27/017 (2013.01); G06T 19/006 (2013.01); H04W 4/02 (2013.01)

(58) Field of Classification Search
CPC ......... G06T 11/00; G06T 13/20; G06T 15/00; G06T 19/006; G06T 2219/024; G06F 3/011; G02B 27/017
USPC ........................................................ 345/633
See application file for complete search history.

(56) References Cited

U.S. PATENT DOCUMENTS

| 8,633,946 B2* | 1/2014 | Cohen ................. A63F 13/10 345/632 |
| 9,041,739 B2 | 5/2015 | Latta et al. |
| 9,143,729 B2 | 9/2015 | Anand et al. |
| 9,195,376 B1* | 11/2015 | Wakeford ............ A63F 13/65 |
| 2008/0310707 A1* | 12/2008 | Kansal ............... G06T 19/006 382/154 |

(Continued)

OTHER PUBLICATIONS

Ahn, "Embodied Experiences in Immersive Virtual Environments: Effects on Pro-Environmental Attitude and Behavior," A Dissertation submitted to the Department of Communication and the Committee on Graduate Studies of Stanford University, May 2011, pp. 1-156.

(Continued)

Primary Examiner — Sae Won Yoon
(74) Attorney, Agent, or Firm — Jordan T. Schiller

(57) ABSTRACT

The program matches a VR environment of a user with an optimal physical location. The method loads a VR program, and detects at least one location-based goal of the user based on a virtual environment of the VR program. The method determines if a current location of the user is an optimal physical location for the at least one location-based goal of the user, based on a plurality of determined criteria associated with the current location and the determined virtual environment associated with the VR program. The method searches for an optimal physical location based on at least one location-based goal of the user and matches the optimal physical location of the user with the at least one location-based goal of the user in the VR program based on the plurality of determined criteria associated with the optimal physical location and the determined virtual environment associated with the VR program.

17 Claims, 7 Drawing Sheets

(56) References Cited

U.S. PATENT DOCUMENTS

| | | | | |
|---|---|---|---|---|
| 2010/0122183 | A1* | 5/2010 | Babaian | H04W 4/02 |
| | | | | 715/752 |
| 2013/0196772 | A1* | 8/2013 | Latta | A63F 13/48 |
| | | | | 463/42 |
| 2016/0027209 | A1 | 1/2016 | Demirli et al. | |
| 2017/0249325 | A1* | 8/2017 | Vangala | G06F 17/3097 |
| 2018/0096528 | A1* | 4/2018 | Needham | G06T 7/70 |
| 2018/0214777 | A1* | 8/2018 | Hingorani | A63F 13/2145 |

OTHER PUBLICATIONS

Disclosed Anonymously, "A Method of Mapping Real World Environments to a Virtual World," An IP.com Prior Art Database Technical Disclosure, IP.com No. IPCOM000244981D, IP.com Electronic Publication Date: Feb. 4, 2016, pp. 1-3.

Disclosed Anonymously, "A system for optimizing space utilization in virtual reality arenas," An IP.com Prior Art Database Technical Disclosure, IP.com No. IPCOM000243916D, IP.com Electronic Publication Date: Oct. 8, 2015, pp. 1-6.

Lifton et al., "Dual Reality: Merging the Real and Virtual" Program in Media Arts and Sciences (Massachusetts Institute of Technology); Massachusetts Institute of Technology. Media Laboratory, Citable URL: http://hdl.handle.net/1721.1/61991, Publisher: Springer-Verlag, Date Issued: Jul. 2009, http://resenv.media.mit.edu/pubs/papers/2009-07-fave2009.pdf, pp. 1-16.

Disclosed Anonymously, "A Method and Apparatus for Haptic Collision in Virtual Reality Environment," An IP.com Prior Art Database Technical Disclosure, IP.com No. IPCOM000197664D, IP.com Electronic Publication Date: Jul. 19, 2010, pp. 1-5.

Oculus VR, Summer of RIFT, Step into the best of AAA VR Gaming, https://www.oculus.com/en-us/, Printed on Jul. 24, 2017, pp. 1-4.

Sony, "Playstation VR, Go on an epic journet with the Grammy winning duo, The Chainsmokers, as you travel through dreamlike environments," https://www.playstation.com/en-us/explore/playstation-vr/, Printed on Jul. 24, 2017, pp. 1-6.

Sun et al., "Mapping Virtual and Physical Reality," SIGGRAPH '16 Technical Paper, Jul. 24-28, 2016, Anaheim, CA, http://www.liyiwei.org/papers/vr-sig16/c1144114_299-a5-paperfinal-v6.pdf, Copyright 2016, pp. 1-12.

Vive, "Get Everything You Need to Take Virtual Reality on the Go with this MSI GS73VR laptop bundle featuring NVIDIA GeForce GTX 1060 graphics," VIVE | Discover Virtual Reality Beyond Imagination, http://www.htcvive.com/us/, Copyright 2011-2017 HTC Corporation, Printed on Jul. 24, 2017, pp. 1-6.

Mell et al., "The NIST Definition of Cloud Computing," National Institute of Standards and Technology, U.S. Department of Commerce, Special Publication 800-145, Sep. 2011, pp. 1-7.

* cited by examiner

SYSTEM AND METHOD FOR MATCHING VIRTUAL REALITY GOALS WITH AN OPTIMAL PHYSICAL LOCATION

BACKGROUND

The present disclosure relates generally to the field of cognitive computing and more particularly to data processing and virtual reality systems.

The physical and sensory world that we live in may be referred to as our collective reality. Console gaming systems and computer software have the ability to remove an individual from the collective reality and metaphorically place them in an alternate reality where they may slay dragons, fight wars, and explore outer space, just to list a few examples. This alternate reality may be referred to as a virtual reality (VR).

The advancements in VR systems have led to the development and use of VR headsets which generate realistic images, sounds and other sensations that simulate a user's physical presence in a virtual, or imaginary, environment. A person using VR equipment is able to "look around" the artificial world, and with high quality VR move around in it and interact with virtual features or items. Unlike using traditional controllers, navigating a VR environment using an apparatus such as a VR headset becomes a physical act involving moving one's head and body to see and interact with different features of the VR environment.

While current VR systems have made great strides in improving a user's VR experience, they lack the ability to fully immerse the user. For example, current VR technology is limited in its ability to engage all of the user's senses (i.e. not just sight and sound) in a realistic way.

BRIEF SUMMARY

Embodiments of the present invention disclose a method, a computer program product, and a system, for matching a VR environment of a user with an optimal physical location.

According to an embodiment, the method loads a VR program, and detects at least one location-based goal of the user based on a determined virtual environment associated with the VR program. The method further determines if a current location of the user is an optimal physical location for the at least one location-based goal of the user, based on a plurality of determined criteria associated with the current location and the determined virtual environment associated with the VR program, and in response to the determination that the current location of the user is not the optimal physical location for the at least one location-based goal of the user in the VR program, searches for the optimal physical location of the user based on the at least one location-based goal of the user and the determined virtual environment associated with the VR program. The method matches the optimal physical location of the user with the at least one location-based goal of the user in the VR program based on the plurality of determined criteria associated with the optimal physical location and the determined virtual environment associated with the VR program.

A computer program product, according to an embodiment of the invention, includes a non-transitory tangible storage device having program code embodied therewith. The program code is executable by a processor of a computer to perform a method. The method loads a VR program, and detects at least one location-based goal of the user based on a determined virtual environment associated with the VR program. The method further determines if a current location of the user is an optimal physical location for the at least one location-based goal of the user, based on a plurality of determined criteria associated with the current location and the determined virtual environment associated with the VR program, and in response to the determination that the current location of the user is not the optimal physical location for the at least one location-based goal of the user in the VR program, searches for the optimal physical location of the user based on the at least one location-based goal of the user and the determined virtual environment associated with the VR program. The method matches the optimal physical location of the user with the at least one location-based goal of the user in the VR program based on the plurality of determined criteria associated with the optimal physical location and the determined virtual environment associated with the VR program.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method loads a VR program, and detects at least one location-based goal of the user based on a determined virtual environment associated with the VR program. The method further determines if a current location of the user is an optimal physical location for the at least one location-based goal of the user, based on a plurality of determined criteria associated with the current location and the determined virtual environment associated with the VR program, and in response to the determination that the current location of the user is not the optimal physical location for the at least one location-based goal of the user in the VR program, searches for the optimal physical location of the user based on the at least one location-based goal of the user and the determined virtual environment associated with the VR program. The method matches the optimal physical location of the user with the at least one location-based goal of the user in the VR program based on the plurality of determined criteria associated with the optimal physical location and the determined virtual environment associated with the VR program.

DETAILED DESCRIPTION

The present invention discloses a method for providing a more realistic VR experience by matching the current context and/or goals of a VR program with the characteristics of a desired physical location, or environment, of the user.

The present invention is based on the premise that optimal immersion in VR engages all of the user's senses, not just sight and sound, thus requiring certain real world characteristics to be discovered and utilized at the proper times and locations. Certain real world characteristics may include, but are not limited to, environmental conditions such as wind, heat, snow, rain, and so forth. Other real world characteristics may include the feel of a tree on your hand, the sand on your feet, the breeze of the ocean on your body, and so forth. This level of realism and interactivity may provide tremendous value beyond anything currently known in the VR art.

For example, in a preferred embodiment, a user may interact with a VR program via an apparatus such as a VR headset. The VR headset may provide a more immersive experience in the VR, as opposed to the user playing a video game on a TV or console, for example. As the user continues to interact with the VR program, the present invention identifies situations in which the user could become even more immersed in the VR via real world sensory interactions.

The present invention employs a "best fit method" to find an optimal physical location for immersing the user in their current VR situation or goal, taking into account the user's actual physical location and VR program context.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
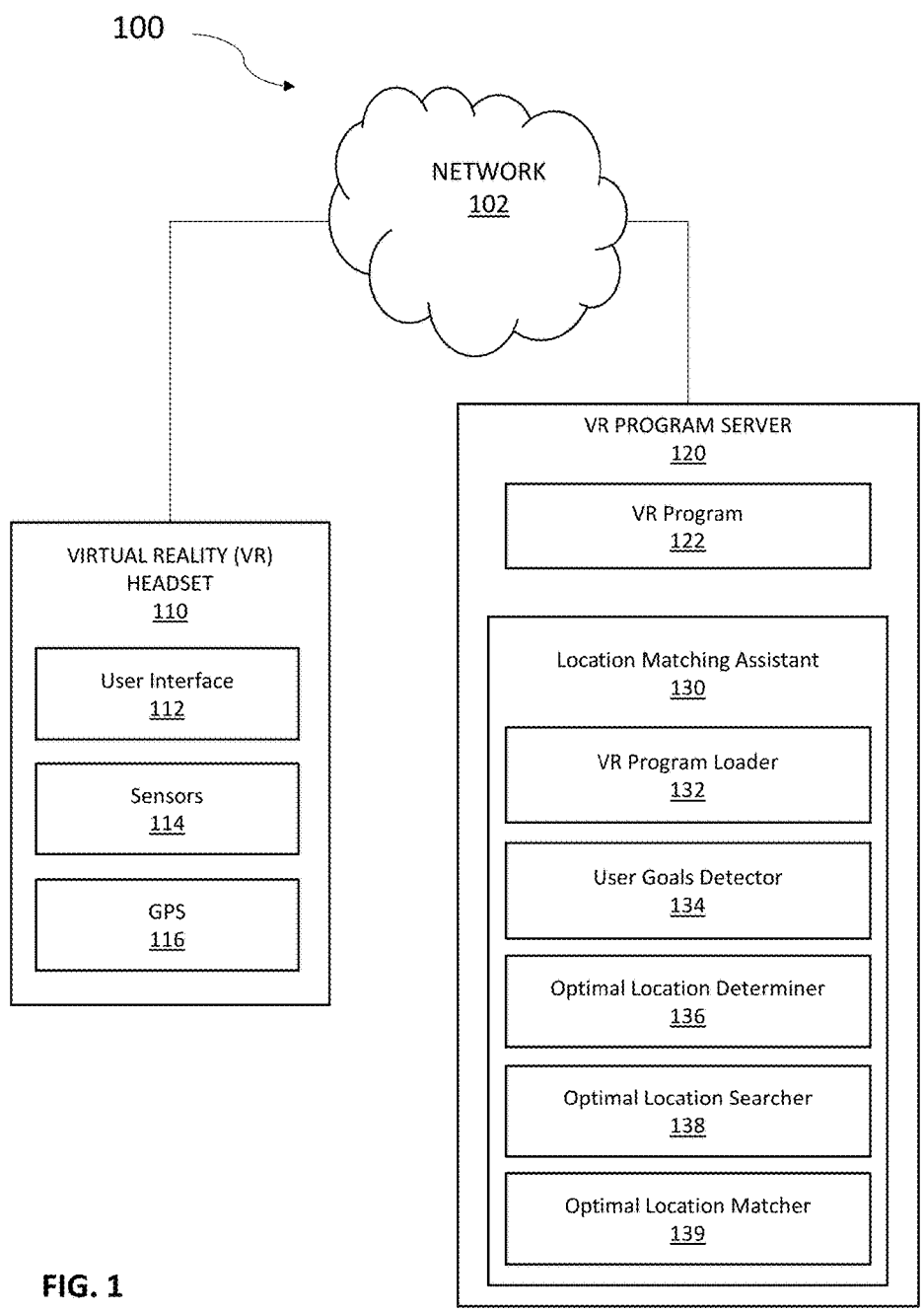
FIG. 1 illustrates virtual reality computing environment 100, in accordance with an embodiment of the present invention.

FIG. 1 illustrates virtual reality computing environment 100, in accordance with an embodiment of the present invention. Virtual reality computing environment 100 includes virtual reality (VR) headset 110, and VR program server 120 all connected via network 102. The setup in FIG. 1 represents an example embodiment configuration for the present invention, and is not limited to the depicted setup in order to derive benefit from the present invention.

In the example embodiment, VR headset 110 contains user interface 112, sensors 114, and global positioning system (GPS) 116. In various embodiments, VR headset 110 may be a laptop computer, tablet computer, netbook computer, personal computer (PC), a desktop computer, a personal digital assistant (PDA), a smart phone, or any programmable electronic device capable of communicating with VR program server 120 via network 102. VR headset 110 may include internal and external hardware components, as depicted and described in further detail below with reference to FIG. 5. In other embodiments, VR headset 110 may be implemented in a cloud computing environment, as described in relation to FIGS. 6 and 7, herein. VR headset 110 may also have wireless connectivity capabilities allowing it to communicate with VR program server 120 and other computers or servers over network 102.

In the example embodiment, VR headset 110 includes user interface 112, which may be a computer program that allows a user to interact with VR headset 110 and other connected devices via network 102. For example, user interface 112 may be a graphical user interface (GUI). In addition to comprising a computer program, user interface 112 may be connectively coupled to hardware components, such as those depicted in FIG. 5, for receiving user input. In an example embodiment, user interface 112 may be a web browser, however in other embodiments user interface 112 may be a different program capable of receiving user interaction and communicating with other devices.

In an example embodiment, sensors 114 may be an electronic component, module, or subsystem capable of detecting events or changes in its environment and sending the detected data to other electronics (e.g. a computer processor), components, or programs (e.g. VR program 122 or location matching assistant 130) within a system such as VR program server 120.

Sensors 114, in an exemplary embodiment, may be located within, or near, VR headset 110. Sensors 114 may be a software application, proximity sensor, camera, microphone, light sensor, infrared sensor, weight sensor, temperature sensor, tactile sensor, motion detector, optical character recognition (OCR) sensor, occupancy sensor, heat sensor, analog sensor (e.g. potentiometers, force-sensing resistors), radar, radio frequency sensor, video camera, digital camera, Internet of Things (IoT) sensors, lasers, gyroscopes, accelerometers, structured light systems, user tracking sensors (e.g. eye, head, hand, and body tracking positions of a user), and other devices used for measuring an environment or current state of the user and/or the physical environment of the user. In the example embodiment, sensors 114 is referenced via network 102.

In exemplary embodiments, the data collected from sensors 114 may be useful in assisting location matching assistant 130 to detect a user context before, during, or after a user engages with a VR headset 110.

In an example embodiment, GPS 116 is a computer program on VR headset 110 that provides time and location information for a user. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In the example embodiment, GPS 116 is capable of providing real-time location detection of a user, walking and/or driving directions for a destination of a user, an estimated time of arrival for a given destination based on real-time traffic, weather conditions, and so forth.

In an example embodiment, VR program server 120 contains VR program 122 and location matching assistant 130. In various embodiments, VR program server 120 may be a laptop computer, tablet computer, netbook computer, personal computer (PC), a desktop computer, a personal digital assistant (PDA), a smart phone, or any programmable electronic device capable of communicating with VR headset 110 via network 102. VR program server 120 may include internal and external hardware components, as depicted and described in further detail below with reference to FIG. 5. In other embodiments, VR program server 120 may be implemented in a cloud computing environment, as described in relation to FIGS. 6 and 7, herein. VR program server 120 may also have wireless connectivity capabilities allowing it to communicate with VR headset 110 and other computers or servers over network 102.

In an exemplary embodiment, VR program 122 refers to any software, program, or system that implements, manages, and controls a single or multiple virtual environment instance. A virtual environment instance may refer to an interactive and immersive VR experience for one or more users. A VR program 122 (i.e. virtual environment software) includes software that creates an interactive and immersive VR experience. In alternative embodiments, VR program 122 may be pre-configured software, program, or system on VR headset 110.

With continued reference to FIG. 1, location matching assistant 130, in the example embodiment, may be a computer application on VR program server 120 that contains instruction sets, executable by a processor. The instruction sets may be described using a set of functional modules. Location matching assistant 130 receives input from user interface 112, sensors 114, GPS 116, and VR program 122. In alternative embodiments, location matching assistant 130 may be a standalone program on a separate electronic device, such as VR headset 110.

In an exemplary embodiment, the functional modules of location matching assistant 130 include VR program loader 132, user goals detector 134, optimal location determiner 136, optimal location searcher 138, and optimal location matcher 139.

With continued reference to FIG. 1, location matching assistant 130 may match a VR environment of a user with an optimal physical location. In an exemplary embodiment, location matching assistant 130 loads a VR program, and detects at least one location-based goal of the user based on a determined virtual environment associated with the VR program. The method further determines if a current location of the user is an optimal physical location for the at least one location-based goal of the user, based on a plurality of determined criteria associated with the current location and the determined virtual environment associated with the VR program, and in response to the determination that the current location of the user is not the optimal physical location for the at least one location-based goal of the user in the VR program, searches for the optimal physical location of the user based on the at least one location-based goal of the user and the determined virtual environment associated with the VR program. The method matches the optimal physical location of the user with the at least one location-based goal of the user in the VR program based on the plurality of determined criteria associated with the optimal physical location and the determined virtual environment associated with the VR program.

Figure 2:
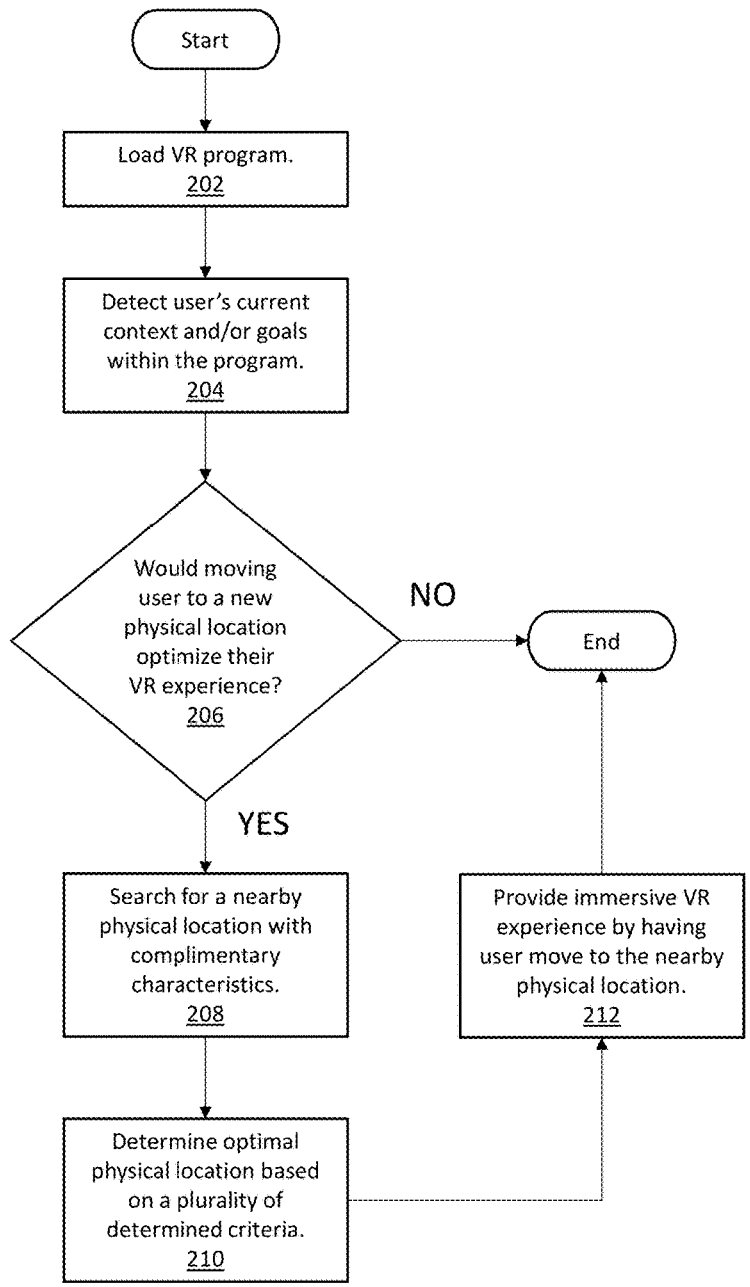
FIG. 2 is a flowchart illustrating the operation of location matching assistant 130 of FIG. 1, in accordance with an embodiment of the present invention.

FIG. 2 is a flowchart illustrating the operation of location matching assistant 130 of FIG. 1, in accordance with an embodiment of the present invention.

With reference to FIGS. 1 and 2, VR program loader 132 includes a set of programming instructions, in location matching assistant 130, to load a VR program 122 (step 202). The set of programming instructions is executable by a processor. In an exemplary embodiment, loading a VR program 122 may involve downloading, or uploading, software to VR headset 110, thereby engaging a user with a game, activity, alternate reality environment, and so forth. A user is thus able to interact with the VR program 122 by immersing into a VR environment.

With reference to an illustrative example, Joe is an avid VR user and has been longing to go away on vacation to Cancun, however his current finances and work schedule will not allow it. In addition, Joe has always wanted a dog, however he lives in a city apartment that does not allow pets. Joe recently downloaded a VR program that allows him to experience a virtual vacation in Cancun along with his own virtual dog.

With continued reference to FIGS. 1 and 2, user goals detector 134 includes a set of programming instructions in location matching assistant 130, to detect at least one location-based goal of the user based on a determined virtual environment associated with the VR program 122 (step 204). The set of programming instructions is executable by a processor. In exemplary embodiments, a location-based goal of the user includes a "real world" physical environment of the user that matches the virtual environment of the VR program 122. For example, a user in a "life under the sea" VR program 122 may want to overcome their fear of swimming with the fishes, and therefore walk in a swimming pool, while engaged in the VR program 122, to feel like they are truly walking with the fishes. As another example, a user in an "Olympic skiing" VR program 122 may prefer to be dressed in their ski clothes and ski boots, while standing outside in the cold weather, while it's snowing, in order to feel the nip in the air and the nervous jitters right before they are about to take an Olympic ski run down the icy slopes, in VR program 122.

In exemplary embodiments, user goals detector 134 may be capable of automatically detecting at least one location-based goal of the user based on the situational context of a VR program 122 (i.e. rainforest anaconda hunting, or sunny walks on the beach in a South American country just to name a few examples). In alternative embodiments, user goals detector 134 may require manual input of the user, via user interface 112, setting forth a specific desired location-based goal, or physical environment, in order to enhance the VR experience.

With reference to the illustrative example above, Joe wants to experience the thrill of running up and down the sandy beach of Cancun playing Frisbee with his dog. However, Joe is frustrated that his current VR experience is limited to his small apartment and hand-held VR controllers, which he uses to move his character along the beach. Joe decides to try out VR headset 110, which includes location matching assistant 130. Luckily for Joe, user goals detector 134 detects Joe's desire to experience the thrill of running up and down the sandy beach of Cancun playing Frisbee with his dog, based on the determined virtual environment associated with the VR program that Joe downloaded.

With continued reference to FIGS. 1 and 2, optimal location determiner 136 includes a set of programming instructions in location matching assistant 130, to determine if a current location of the user is an optimal physical location for the at least one location-based goal of the user, based on a plurality of determined criteria associated with the current location and the determined virtual environment associated with the VR program 122 (step 206). The set of programming instructions is executable by a processor. In an exemplary embodiment, a current location of the user includes the physical environment where the user currently exists, as may be detected via sensors 114 and GPS 116. For example, optimal location determiner 136 is capable of obtaining a current location of the user based on a global positioning system (GPS), such as GPS 116. A current location of the user may be valuable in detecting current weather conditions for the user's location, as well as proximity to an optimal physical location for the user, and relaying that information to location matching assistant 130. An optimal location for the user may include a physical environment that is best suited for the user to more fully experience the virtual environment associated with the VR program 122, based on at least one location-based goal of the user.

In exemplary embodiments, the at least one location-based goal of the user comprises a physical attribute associated with the determined virtual environment in the VR program. For example, a swimming pool may be the best suited physical environment for the user to more fully experience a "life under the sea" VR program.

In exemplary embodiments, the plurality of determined criteria is selected from a plurality of attributes comprising: a proximity of the user to the optimal physical location, a barrier to reaching the optimal physical location by the user, a time constraint of the user, a square footage of the optimal physical location, a temperature, an indoor/outdoor physical location, and one or more available natural elements. In exemplary embodiments, a barrier to reaching an optimal physical location by the user may include traffic patterns, existing use of the physical location, and any other scenario that may prevent a user from utilizing a physical location in conjunction with a VR experience. For example, if an optimal physical location for the user to virtually experience flying a kite is a large open field located in a local park, then a barrier to using that field may be a youth soccer league is currently playing there.

In exemplary embodiments, one or more available natural elements may include earth, wind, fire, rain, snow, water, sand, and any other element found in nature.

With continued reference to the illustrative example above, when Joe loads the Cancun vacation VR program, optimal location determiner 136 employs its "best fit" algorithm to determine a physical location that best matches the characteristics needed for Joe to more fully experience a day at the beach. In this case, the characteristics may include: nearby Joe's apartment, outdoors, element of sand, and relatively large square footage. Optimal location determiner 136 determines that a park with a sand volleyball court is an optimal location for Joe to experience this VR program.

With continued reference to FIGS. 1 and 2, optimal location searcher 138 includes a set of programming instructions in location matching assistant 130. In response to the determination that the current location of the user is not the optimal physical location for the at least one location-based goal of the user in the VR program 122 (step 206 YES branch), optimal location searcher 138 searches for the optimal physical location of the user based on the at least one location-based goal of the user and the determined virtual environment associated with the VR program 122 (step 208). The set of programming instructions is executable by a processor.

In response to the determination that the current location of the user is the optimal physical location for the at least one location-based goal of the user in the VR program 122 (step 206 NO branch), location matching assistant 130 ends.

In exemplary embodiments, searching for the optimal physical location of the user based on the at least one goal of the user in the VR program 122, may include determining at least one candidate location that corresponds to the determined virtual environment associated with the VR program 122 by detecting the plurality of attributes of the at least one candidate location, and comparing the plurality of attributes of the at least one candidate location with one or more attributes of the determined virtual environment associated with the VR program 122.

In exemplary embodiments, optimal location searcher 138 may then select the at least one candidate location as the optimal physical location based on a match between the plurality of attributes associated with the at least one candidate location and the one or more attributes of the determined virtual environment associated with the VR program.

In various embodiments, optimal location searcher 138 may search for a plurality of optimal physical locations with the at least one location-based goal of the user in the VR program 122, based on the plurality of determined criteria associated with the plurality of optimal physical locations and the determined virtual environment associated with the VR program. In this scenario, optimal location searcher 138 may rank the plurality of optimal physical locations based on a comparison between the plurality of determined criteria for each of the plurality of optimal physical locations.

For example, with continued reference to the illustrative example above, optimal location searcher 138 determines that Joe is only a five-minute walk away from a nearby park, which includes a sand volleyball court. The attributes of the sand volleyball court in the park correspond to the determined virtual environment associated with Joe's VR program (e.g. nearby, outdoors, includes a relatively large square footage area, and contains the element of sand).

In alternative embodiments, optimal location searcher 138 may determine that there are multiple parks within a 10-mile radius of Joe's apartment. Each park may contain physical attributes that make it a more desirable location to experience the VR program 122 than other parks. Optimal location searcher 138, in exemplary embodiments, may rank the plurality of optimal physical locations based on a comparison between the plurality of determined criteria for each of the plurality of optimal physical locations. For example, some of the parks may include a larger sand volleyball court, while others may include scheduled sports programs taking place, inclement weather, and so forth. Park information, events, weather, traffic, and other information may be gleaned from online sources and GPS 116 data.

With continued reference to FIGS. 1 and 2, optimal location matcher 139 includes a set of programming instructions in location matching assistant 130, to match the optimal physical location of the user with the at least one location-based goal of the user in the VR program 122 based on the plurality of determined criteria associated with the optimal physical location and the determined virtual environment associated with the VR program 122 (step 210). The set of programming instructions is executable by a processor.

In exemplary embodiments, matching the optimal physical location of the user with the at least one location-based goal of the user in the VR program 122, may further include weighing and ranking the plurality of determined criteria associated with the at least one location-based goal of the user in the VR program 122 and the optimal physical location.

In an exemplary embodiment, VR program 122 may include a feature, such as GPS 116, that intelligently leads the user to the selected optimal physical location (step 212).

Figure 3:
FIG. 3 depicts a third party's viewpoint of a user engaging in a VR experience at an optimal physical location, while utilizing the present invention, in accordance with an embodiment of the present invention.

FIG. 3 depicts a third party's viewpoint of a user engaging in a VR experience at an optimal physical location, while utilizing the present invention, in accordance with an embodiment of the present invention.

Figure 4:
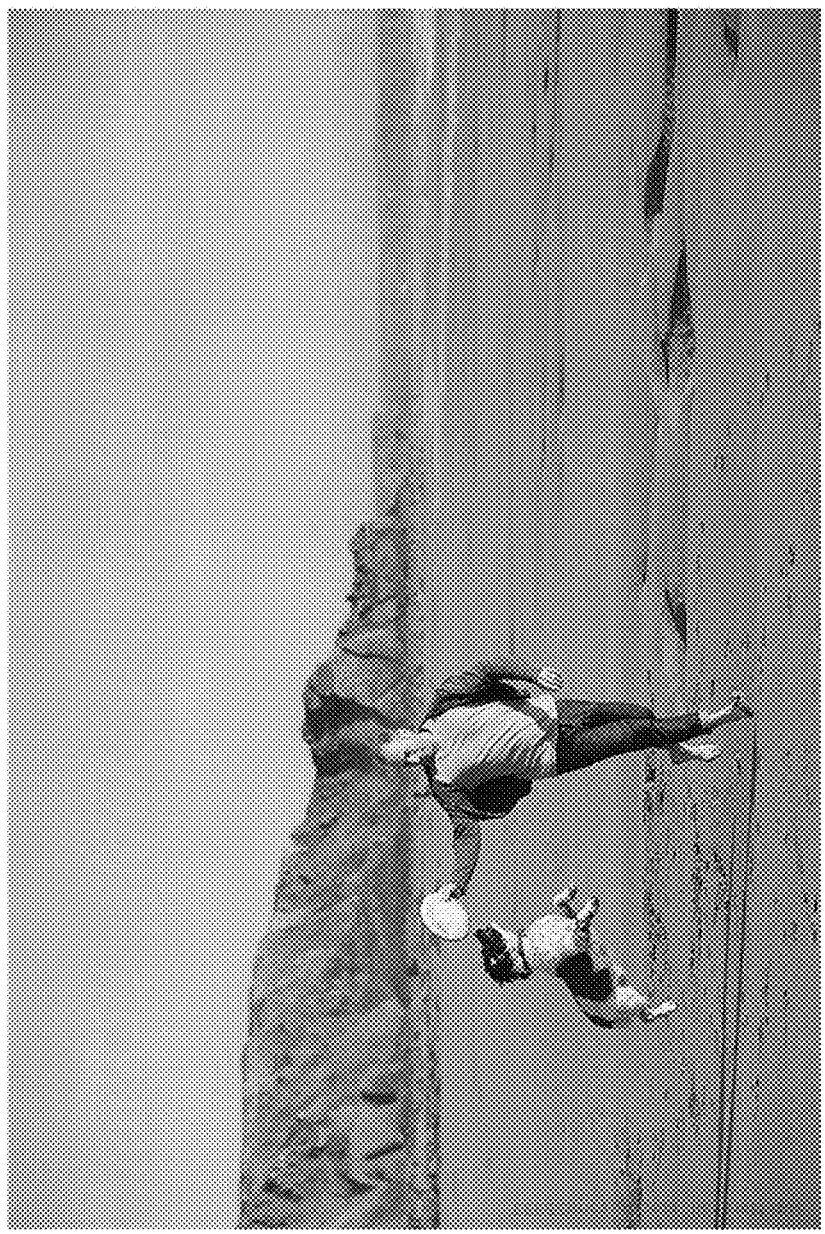
FIG. 4 depicts a user's viewpoint while engaging in a VR experience at an optimal physical location, while utilizing the present invention, in accordance with an embodiment of the present invention.

FIG. 4 depicts a user's viewpoint while engaging in a VR experience at an optimal physical location, while utilizing the present invention, in accordance with an embodiment of the present invention.

With reference to FIGS. 3 and 4, and with continued reference to the illustrative example above, optimal location matcher 139 matches the park near Joe's apartment as the optimal location for experiencing the VR program 122. The VR program 122 intelligently leads Joe to the nearby park where he can play Frisbee with his dog in a more natural way by running in the sand.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between VR headset110, and VR program server 120.

Figure 5:
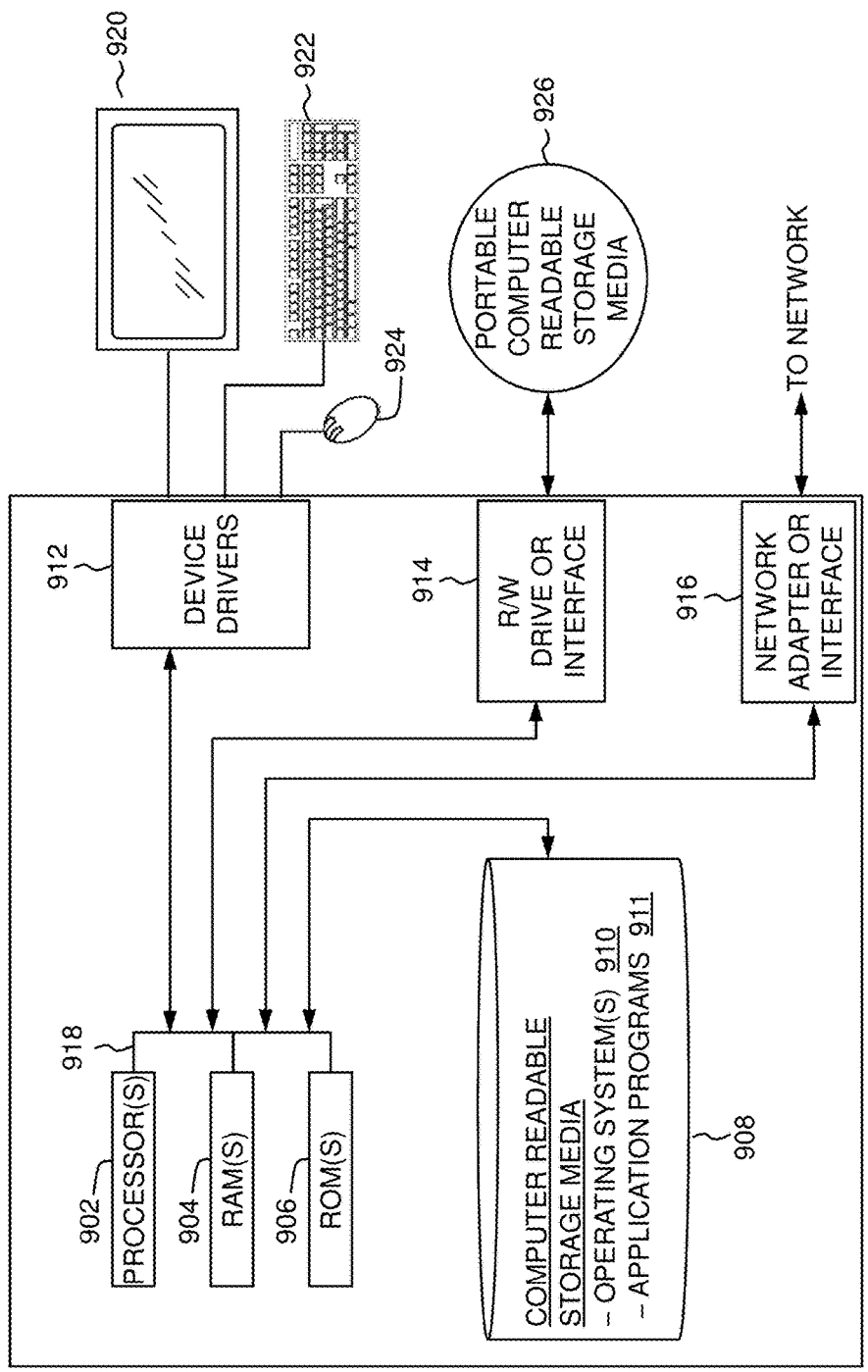
FIG. 5 is a diagram graphically illustrating the hardware components of virtual reality computing environment 100 of FIG. 1, in accordance with an embodiment of the present invention.

FIG. 5 is a block diagram depicting components of a computing device (such as VR headset 110 or VR program server 120, as shown in FIG. 1), in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing device of FIG. 5 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as location matching program 130, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device may also include a network adapter or interface 916, such as a TCP/IP adapter card or wireless communication adapter (such as a 4G wireless communication adapter using OFDMA technology). Application programs 911 on computing device may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 6:
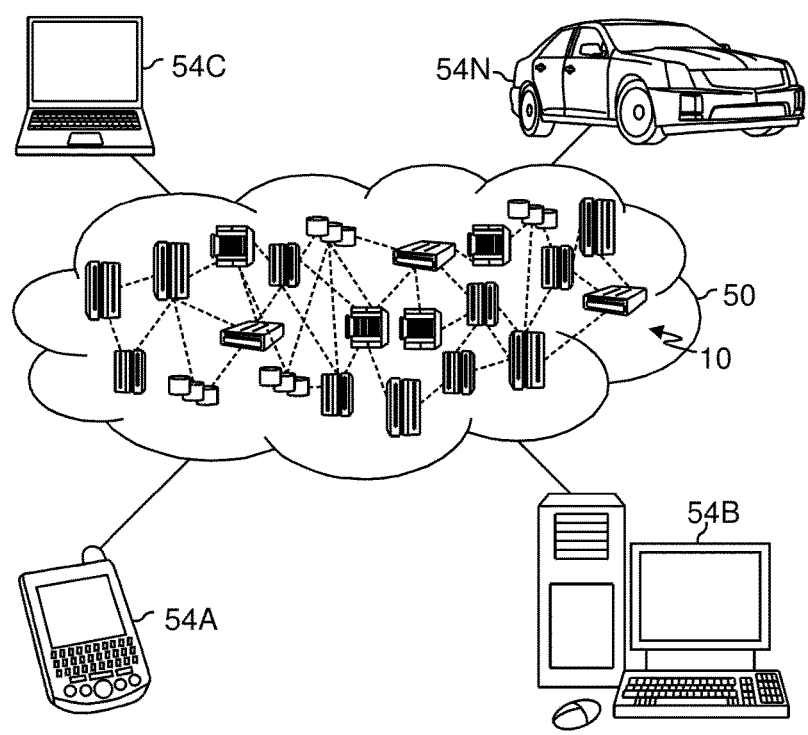
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
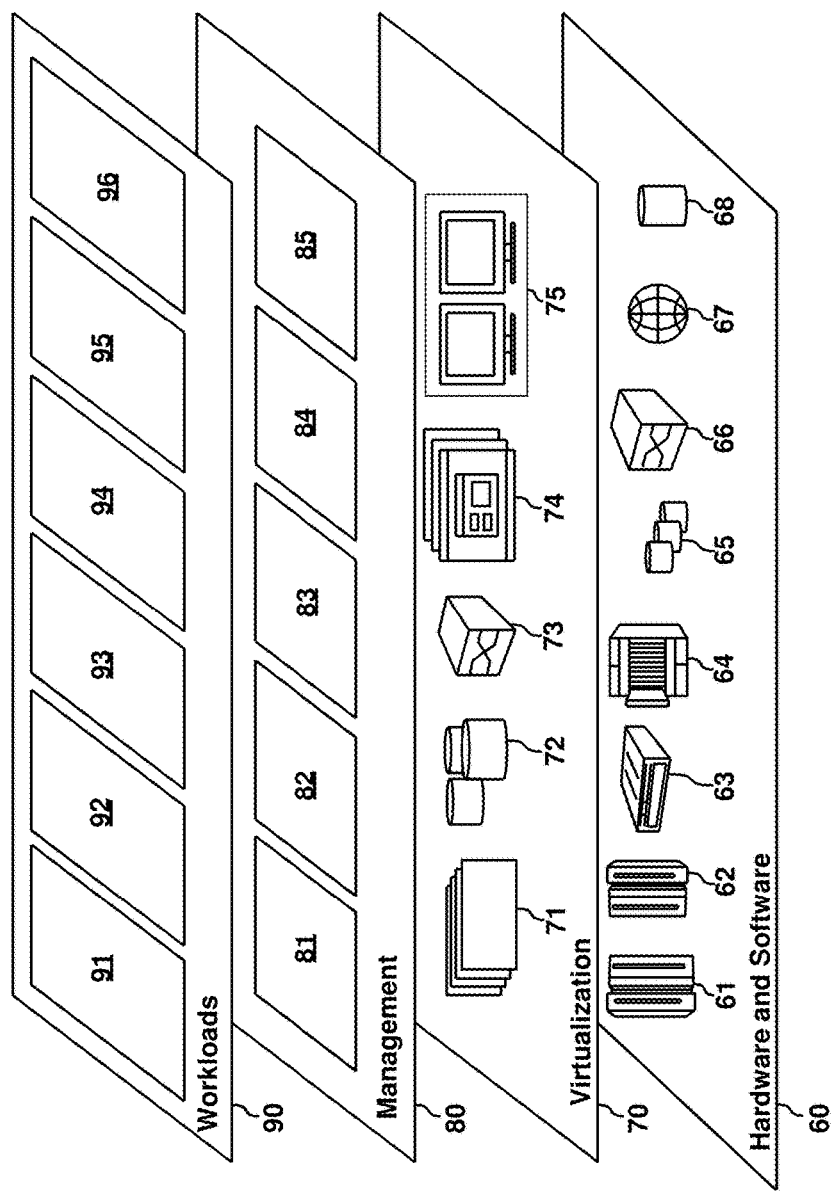
FIG. 7 depicts abstraction model layers of the illustrative cloud computing environment of FIG. 6, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for matching a virtual reality (VR) environment of a user with an optimal physical location, comprising:
    loading a VR program;
    detecting at least one location-based goal of the user based on a determined virtual environment associated with the VR program, wherein the at least one location-based goal of the user comprises at least one sensory element for interaction with the user, and wherein the at least one sensory element for interaction with the user comprises the user coming in physical contact with at least one, or combination, of: rain, wind, snow, heat, cold, water, sand, earth, fire, and any other natural element;
    determining if a current location of the user is an optimal physical location for the at least one location-based goal of the user, based on a plurality of physical attributes associated with the current location and the determined virtual environment associated with the VR program;
    in response to the determination that the current location of the user is not the optimal physical location for the at least one location-based goal of the user in the VR program, searching for the optimal physical location of the user based on the at least one location-based goal of the user and the determined virtual environment associated with the VR program; and
    matching the optimal physical location of the user with the at least one location-based goal of the user in the VR program based on a plurality of determined criteria associated with the optimal physical location and the determined virtual environment associated with the VR program.

2. The computer-implemented method of claim 1, further comprising: obtaining the current location of the user based on a global positioning system (GPS).

3. The computer-implemented method of claim 1, wherein the plurality of determined criteria associated with the optimal physical location comprises at least one, or combination of, the following: a proximity of the user to the optimal physical location, a barrier in reaching the optimal physical location by the user, a time constraint of the user, a square footage of the optimal physical location, a temperature, an indoor/outdoor physical location, and one or more available natural elements.

4. The computer-implemented method of claim 3, wherein searching for the optimal physical location of the user based on the at least one goal of the user in the VR program, further comprises:
    determining at least one candidate location that corresponds to the determined virtual environment associated with the VR program by detecting a second plurality of attributes associated with the at least one candidate location, wherein the second plurality of attributes associated with the at least one candidate location comprises the at least one sensory element;
    comparing the second plurality of attributes associated with the at least one candidate location with one or more attributes of the determined virtual environment associated with the VR program; and
    selecting the at least one candidate location as the optimal physical location based on a match between the second plurality of attributes associated with the at least one candidate location and the one or more attributes of the determined virtual environment associated with the VR program.

5. The computer-implemented method of claim 4, wherein matching the optimal physical location of the user with the at least one location-based goal of the user in the VR program, further comprises:
    weighing and ranking the plurality of determined criteria associated with the optimal physical location.

6. The computer-implemented method of claim 1, further comprising: ranking a plurality of optimal physical locations based on a comparison between first plurality of determined criteria for one of the plurality of optical physical locations and second plurality of determined criteria for another of the plurality of optimal physical locations.

7. A computer program product for implementing a program that manages a device, comprising a non-transitory tangible storage device having program code embodied therewith, the program code executable by a processor of a computer to perform a method, the method comprising:
    loading a VR program;
    detecting at least one location-based goal of the user based on a determined virtual environment associated with the VR program, wherein the at least one location-based goal of the user comprises at least one sensory element for interaction with the user, and wherein the at least one sensory element for interaction with the user comprises the user coming in physical contact with at least one, or combination, of: rain, wind, snow, heat, cold, water, sand, earth, fire, and any other natural element;

determining if a current location of the user is an optimal physical location for the at least one location-based goal of the user, based on a plurality of physical attributes associated with the current location and the determined virtual environment associated with the VR program;

in response to the determination that the current location of the user is not the optimal physical location for the at least one location-based goal of the user in the VR program, searching for the optimal physical location of the user based on the at least one location-based goal of the user and the determined virtual environment associated with the VR program; and matching the optimal physical location of the user with the at least one location-based goal of the user in the VR program based on a plurality of determined criteria associated with the optimal physical location and the determined virtual environment associated with the VR program.

8. The computer program product of claim 7, further comprising: obtaining the current location of the user based on a global positioning system (GPS).

9. The computer program product of claim 7, wherein the plurality of determined criteria associated with the optimal physical location comprises at least one, or combination of, the following: a proximity of the user to the optimal physical location, a barrier in reaching the optimal physical location by the user, a time constraint of the user, a square footage of the optimal physical location, a temperature, an indoor/outdoor physical location, and one or more available natural elements.

10. The computer program product of claim 9, wherein searching for the optimal physical location of the user based on the at least one goal of the user in the VR program, further comprises:

determining at least one candidate location that corresponds to the determined virtual environment associated with the VR program by detecting a second plurality of attributes associated with the at least one candidate location, wherein the second plurality of attributes associated with the at least one candidate location comprises the at least one sensory element;

comparing the second plurality of attributes associated with the at least one candidate location with one or more attributes of the determined virtual environment associated with the VR program; and selecting the at least one candidate location as the optimal physical location based on a match between the second plurality of attributes associated with the at least one candidate location and the one or more attributes of the determined virtual environment associated with the VR program.

11. The computer program product of claim 10, wherein matching the optimal physical location of the user with the at least one location-based goal of the user in the VR program, further comprises:

weighing and ranking the plurality of determined criteria associated with the optimal physical location.

12. The computer program product of claim 7, further comprising: ranking a plurality of optimal physical locations based on a comparison between first plurality of determined criteria for one of the plurality of optical physical locations and second plurality of determined criteria for another of the plurality of optimal physical locations.

13. A computer system for implementing a program that manages a device, comprising:

one or more computer devices each having one or more processors and one or more tangible storage devices; and a program embodied on at least one of the one or more storage devices, the program having a plurality of program instructions for execution by the one or more processors, the program instructions comprising instructions for:

loading a VR program;

detecting at least one location-based goal of the user based on a determined virtual environment associated with the VR program, wherein the at least one location-based goal of the user comprises at least one sensory element for interaction with the user, and wherein the at least one sensory element for interaction with the user comprises the user coming in physical contact with at least one, or combination, of: rain, wind, snow, heat, cold, water, sand, earth, fire, and any other natural element;

determining if a current location of the user is an optimal physical location for the at least one location-based goal of the user, based on a plurality of physical attributes associated with the current location and the determined virtual environment associated with the VR program;

in response to the determination that the current location of the user is not the optimal physical location for the at least one location-based goal of the user in the VR program, searching for the optimal physical location of the user based on the at least one location-based goal of the user and the determined virtual environment associated with the VR program; and matching the optimal physical location of the user with the at least one location-based goal of the user in the VR program based on a plurality of determined criteria associated with the optimal physical location and the determined virtual environment associated with the VR program.

14. The computer system of claim 13, further comprising: obtaining the current location of the user based on a global positioning system (GPS).

15. The computer system of claim 13, wherein the plurality of determined criteria associated with the optimal physical location comprises at least one, or combination of, the following: a proximity of the user to the optimal physical location, a barrier to in reaching the optimal physical location by the user, a time constraint of the user, a square footage of the optimal physical location, a temperature, an indoor/outdoor physical location, and one or more available natural elements.

16. The computer system of claim 15, wherein searching for the optimal physical location of the user based on the at least one goal of the user in the VR program, further comprises:

determining at least one candidate location that corresponds to the determined virtual environment associated with the VR program by detecting a second plurality of attributes associated with the at least one candidate location, wherein the second plurality of attributes associated with the at least one candidate location comprises the at least one sensory element;

comparing the second plurality of attributes associated with the at least one candidate location with one or more attributes of the determined virtual environment associated with the VR program; and selecting the at least, one candidate location as the optimal physical location based on a match between the second plurality of attributes associated with the at least one candidate location and the one or more attributes of the determined virtual environment associated with the VR program.

17. The computer system of claim 16, wherein matching the optimal physical location of the user with the at least one location-based goal of the user in the VR program, further comprises:
   weighing and ranking the plurality of determined criteria associated with the optimal physical location.

* * * * *